United States Patent [19]
Uno et al.

[11] Patent Number: 5,772,794
[45] Date of Patent: Jun. 30, 1998

[54] MANUFACTURING METHOD OF MAGNETIC HEAD APPARATUS WITH SPIN VALVE EFFECT MAGNETORESISTIVE HEAD

[75] Inventors: Yasufumi Uno, Nagano; Daisuke Miyauchi, Tokyo; Mikio Matsuzaki, Saitama, all of Japan

[73] Assignee: TDK Corporation, Tokyo, Japan

[21] Appl. No.: 729,762

[22] Filed: Oct. 7, 1996

[30] Foreign Application Priority Data

Oct. 9, 1995 [JP] Japan .................................... 7-286391

[51] Int. Cl.$^6$ .............................................. C21D 1/04
[52] U.S. Cl. ...................... 148/108; 360/113; 29/603.08
[58] Field of Search ............................ 148/108; 360/113; 29/603.08

[56] References Cited

U.S. PATENT DOCUMENTS

| 4,103,315 | 7/1978 | Hempstead et al. | 360/110 |
| 5,206,590 | 4/1993 | Dieny et al. | 324/252 |
| 5,385,637 | 1/1995 | Thayamballi | 156/656 |
| 5,529,814 | 6/1996 | Tan et al. | 427/547 |
| 5,549,978 | 8/1996 | Iwasaki et al. | 428/642 |
| 5,648,885 | 7/1997 | Nishioka et al. | 360/113 |

FOREIGN PATENT DOCUMENTS

| 0 314 343 | 5/1989 | European Pat. Off. . |
| 0 471 946 | 2/1992 | European Pat. Off. . |
| 0 585 009 A2 | 3/1994 | European Pat. Off. . |
| 0 687 917 A2 | 12/1995 | European Pat. Off. . |
| 0 694 788 A2 | 1/1996 | European Pat. Off. . |
| 5-347013 | 12/1993 | Japan . |

OTHER PUBLICATIONS

Database WPI, Section EI, Week 9611, Derwent Publications Ltd., London, GB; Class S01, AN 96–031918 XP002021523 & JP-A-08 007 235, Jan. 12, 1996 and EP-A-0 687 917, Dec. 20, 1995.

*Primary Examiner*—John Sheehan
*Attorney, Agent, or Firm*—Nikaido, Marmelstein, Murray & Oram LLP

[57] ABSTRACT

A method of manufacturing a magnetic head apparatus with a magnetoresistive head utilizing the spin valve effect includes a final heat treatment step (S14) of heating the multi-layered spin valve structure (15) with application of a magnetic field in a direction perpendicular to a track width direction of the spin valve magnetoresistive head so that a thin film layer of soft ferromagnetic material (3, 5) to be pinned by a thin film layer of antiferromagnetic material (6) has a uniaxial anisotropy. This final heat treatment step (S14) is executed after all the steps (S1, S3, S5, S7, S8, S9, S11) each of which includes a heat treatment stage executed at a temperature which will vary a uniaxial anisotropy of the pinned thin film layer of soft ferromagnetic material (3,5) are completed.

9 Claims, 7 Drawing Sheets

MANUFACTURING METHOD OF MAGNETIC HEAD APPARATUS WITH SPIN VALVE EFFECT MAGNETORESISTIVE HEAD

FIELD OF THE INVENTION

The present invention relates to a method of manufacturing a magnetic head apparatus with a magnetoresistive (MR) head utilizing the spin valve effect.

DESCRIPTION OF THE RELATED ART

A spin valve effect element is known as one of elements providing the giant magnetoresistive effect. This spin valve effect element has a sandwiched structure with two magnetic material layers separated by a non-magnetic material layer. An antiferromagnetic material layer is laminated in contact with one of the two uncoupled magnetic material layers so as to produce an exchange biasing magnetic field at their boundary and to apply it to this magnetic material layer. Therefore, this one magnetic material layer receives the exchange biasing magnetic field, whereas the other magnetic material layer receives no exchange biasing magnetic field so that magnetization switching is introduced by different magnetic field between the two magnetic material layers. The magnetization directions of the two magnetic material layers therefore change between in parallel and in antiparallel with each other so that the electrical resistivity of this spin valve effect element greatly varies to obtain the large MR effects.

Applicants of this application have proposed a MR head utilizing the above-mentioned spin valve effect (U.S. patent application Ser. No. 08/601,857 now pending). This MR head has a spin valve effect element constituted by sequentially depositing at least a first thin film layer of magnetic material, a thin film layer of non-magnetic material, a second thin film layer of magnetic material and a thin film layer of antiferromagnetic material on a substrate. The first thin film layer of magnetic material is formed only in a central active region corresponding to a track width of the head.

In general, a wafer process or working process for manufacturing a thin film magnetic head will certainly contain a heat treatment stage in which the magnetic layers are heated at a temperature of about 100° to 250° C. This heat treatment stage may be, for example, a stage for curing the resist during insulator layer formation in the wafer process or a stage for adhering the magnetic head to a jig, particularly when a hot-melt type adhesive is used, in the working process. In order to execute such the heat treatment stages, especially a heat treatment stage at a process temperature which will vary a uniaxial anisotropy of the magnetic material layer which receives the exchange biasing magnetic field from the antiferromagnetic material layer during the processes for manufacturing a thin film magnetic head with a spin valve effect MR element, it is necessary to control the antiferromagnetic exchange bias to a predetermined direction at each heat treatment stage.

A method is known for controlling the uniaxial anisotropy, wherein the heat treatment of the magnetic layers near the Neel temperature (Neel point) will be executed by simultaneously applying a predetermined direction of magnetic field thereto.

However, to apply the magnetic field for controlling the uniaxial anisotropy of the magnetic material layer at each heat treatment stage in the wafer process or working process of the magnetic head manufacturing will greatly increase the complicated works.

Also, if the manufacturing process includes a stage for magnetizing thin film layers of hard ferromagnetic material formed on both ends of the first thin film layer of magnetic material, these hard ferromagnetic material layers may be magnetized toward incorrect directions by this magnetic field of one to several tens kilo-Gauss used for controlling the anisotropy.

Furthermore, although all the magnetic layers other than the antiferromagnetic layer and than the second thin film magnetic material layer whose uniaxial anisotropy is controlled by the antiferromagnetic layer are necessary for maintaining or improving their magnetic characteristics by receiving magnetic field along the axis of easy magnetization which has already provided to the first thin film magnetic material layer, the above-mentioned magnetic field executed at each heat treatment stage may magnetize these magnetic layers toward incorrect directions.

It is disclosed in Japanese Unexamined Patent Publication No.5(1993)-347013 that the antiferromagnetic bias direction in a spin valve effect MR head is induced during or after the formation of multi-layered thin films. However, according to this known anisotropy inducing method, the magnetization direction of the magnetic layers may be disordered due to the heat treatment executed in the working process following the wafer process, and thus correct unidirectional anisotropy may not be obtained. This tendency will be strongly appeared when the antiferromagnetic layer is made of an antiferromagnetic material with a relatively low Neel temperature (equal to or less than 150° C.), such as FeMn.

SUMMARY OF THE INVENTION

It is therefore an object of the present invention to provide a method of manufacturing a magnetic head apparatus with a MR head utilizing the spin valve effect, whereby the anisotropy provided for a magnetic thin film layer in the magnetic head can be correctly and surely controlled.

Another object of the present invention is to provide a method of manufacturing a magnetic head apparatus with a MR head utilizing the spin valve effect, whereby deterioration of each thin film layer in the magnetic head can be reduced.

A method according to the present invention basically includes a step of forming a multi-layered spin valve structure on a substrate, which structure includes at least first and second thin film layers of soft ferromagnetic material separated by a thin film layer of non-magnetic material, one of the first and second thin film layers of ferromagnetic material being pinned by a thin film layer of antiferromagnetic material, a step of forming a spin valve MR head using the multi-layered spin valve structure, and a step of assembling a magnetic head apparatus using the spin valve MR head. At least one of the above-mentioned steps includes a heat treatment stage executed at a temperature which will vary a uniaxial anisotropy of the pinned thin film layer of soft ferromagnetic material. According to the present invention, particularly, the method further includes a final heat treatment step of heating the multi-layered spin valve structure with application of a magnetic field in a direction perpendicular to a track width direction of the spin valve MR head so that the pinned thin film layer of soft ferromagnetic material has a uniaxial anisotropy. This final heat treatment step is executed after all the steps each of which includes the heat treatment stage are completed.

According to the present invention, the final heat treatment step for providing one of the thin film layers of soft ferromagnetic material which is pinned by the thin film layer of antiferromagnetic material a uniaxial anisotropy is executed after all the heat treatment stages in which their process temperature will vary the uniaxial anisotropy of the pinned soft ferromagnetic material layer are completed. Therefore, even if the antiferromagnetic material with a relatively low Neel temperature such as FeMn or NiO is used, the uniaxial anisotropy provided for one of the thin film layers of soft ferromagnetic material can be correctly and surely controlled.

It is preferred that the final heat treatment step is a step of heating the multi-layered spin valve structure at a temperature equal to or higher than a temperature at which a shifted amount of the BH loop of the pinned thin film layer of soft ferromagnetic material after the heat treatment (Hua) is equal to a 20% value of the maximum value of the shifted amount (Hua).

More preferably, the final heat treatment step is a step of heating the multi-layered spin valve structure at a temperature substantially equal to or higher than the Neel temperature of the antiferromagnetic material of the antiferromagnetic thin film layer. Most preferably, the final heat treatment step is a step of heating the multi-layered spin valve structure at a temperature equal to or higher than the Neel temperature of the antiferromagnetic material of the antiferromagnetic thin film layer.

It is preferred that the heat treatment stage executed before the final heat treatment step is processed at a temperature equal to or lower than 300° C. Also, it is preferred that the final heat treatment step itself is processed at a temperature equal to or lower than 300° C. If all the heat treatment, not only the final heat treatment but also any heat treatment processed before the final heat treatment, are executed at a temperature equal to or lower than 300° C., deterioration of each thin film layer in the head can be reduced.

Preferably, the heat treatment stage executed before the final heat treatment step includes a heat treatment stage applying a magnetic field in a direction along the track width direction to the multi-layered spin valve structure. As a result of this application of the magnetic field, the magnetic characteristics of the other one of thin film layers of soft ferromagnetic material, of a lower shield layer, of an upper shield layer and of an upper pole layer in the magnetoresistive spin valve head can be stabilized.

It is preferred that the other one of the first and second thin film layers of ferromagnetic material being unpinned by a thin film layer of antiferromagnetic material, and that the method further includes a step of forming thin film layers of hard ferromagnetic material in contact with both ends in the track width direction of the unpinned thin film layer of soft ferromagnetic material, respectively.

Preferably, the method further includes a step of applying a magnetic field in the track width direction to the thin film layers of hard ferromagnetic material so as to magnetize these thin film layers of hard ferromagnetic material. This applying step is executed after the final heat treatment step is completed. Since the magnetization of the thin film layers of hard ferromagnetic material is executed after the final heat treatment step, the correct magnetization direction can be certainly obtained.

Preferably, the method further includes a step of forming thin film layers of conductive material on the thin film layers of hard ferromagnetic material, respectively.

Further objects and advantages of the present invention will be apparent from the following description of the preferred embodiments of the invention as illustrated in the accompanying drawings.

DESCRIPTION OF THE PREFERRED EMBODIMENTS

FIGS. 1a to 1d schematically illustrate a part of a wafer process in a preferred embodiment of a spin valve MR head according to the present invention.

Figure 1A:
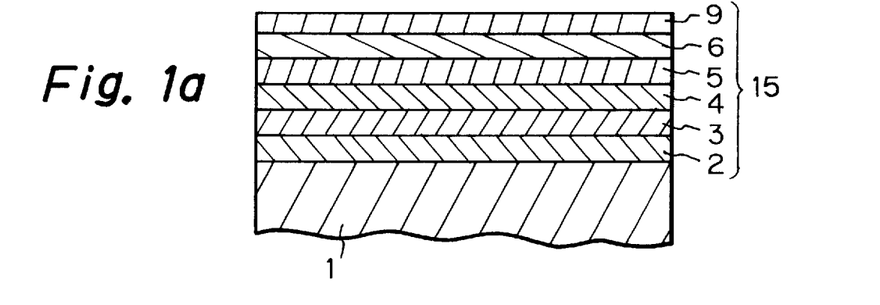
FIGS. 1a to 1d are sectional views schematically illustrating a part of a wafer process in a preferred embodiment of a spin valve MR head according to the present invention.

In FIG. 1a, reference numeral 1 denotes a substrate formed by depositing an under film made of for example $Al_2O_3$ on a wafer made of for example glass, ceramic (AlTiC) or semiconductor material, and then by polishing the surface of the deposited under film. On the substrate 1, an under layer 2 made of for example Ta with a thickness of about 70 Angstroms is deposited. This under layer 2 is made of a high resistivity material such as for example Ta, Ru or CrV so as to optimize the texture of the subsequent spin valve layers. If the substrate 1 itself has a high resistivity and an optimum crystal structure, the under layer 2 can be omitted.

On the under layer 2, a spin valve multi-layered structure is formed. The spin valve multi-layered structure in this embodiment is formed by sequentially depositing in this order a first thin film layer of soft ferromagnetic material 3 such as NiFe with a thickness of about 70 Angstroms, a thin film layer of non-magnetic metallic material 4 such as Cu with a thickness of about 30 Angstroms, a second thin film layer of soft ferromagnetic material 5 such as NiFe with a thickness of about 70 Angstroms and a thin film layer of antiferromagnetic material 6 such as FeMn with a thickness of about 100 Angstroms. The first and second thin film layers of soft ferromagnetic material 3 and 5 can be made of, other than NiFe, for example Co, Fe, Ni, NiCo or FeCo. The thin film layer of non-magnetic metallic material 4 can be made of, other than Cu, a metallic material with a high electric conductivity such as for example Au or Ag. The thin film layer of antiferromagnetic material can be made of, other than FeMn, for example NiO with a thickness of about 550 Angstroms.

In a modified embodiment, the spin valve multi-layered structure may be formed by depositing the layers in an order opposite to the above-mentioned order. Namely, on the under layer, a thin film layer of antiferromagnetic material, a second thin film layer of soft ferromagnetic material, a thin film layer of non-magnetic metallic material and a first thin film layer of soft ferromagnetic material may be sequentially deposited in this order.

A capping layer of high resistivity material 9 such as Ta with a thickness of about 70 Angstroms is deposited on the spin valve multi-layered structure.

Figure 1B:
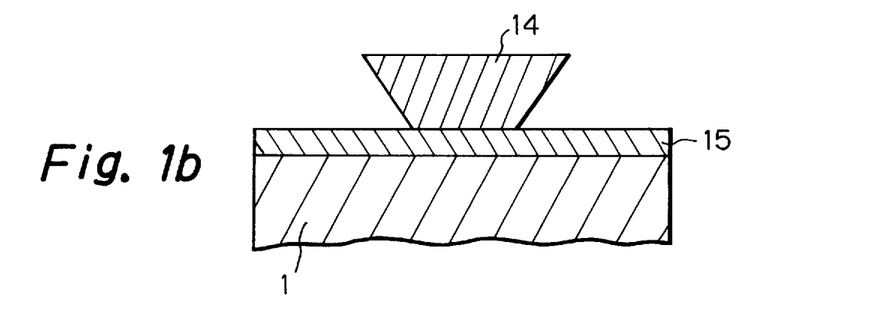

Then, as shown in FIG. 1b, a photoresist film is coated over the capping layer 9 and then a stencil mask 14 of the photoresist having a pattern for masking the central active region substantially corresponding to a track width of the MR head and undercut portions at its side faces is formed by performing an appropriate known method. In FIG. 1b, a reference numeral 15 denotes a layered product constituted by the under layer 2, the first soft ferromagnetic material layer 3, the non-magnetic metallic material layer 4, the second soft ferromagnetic material layer 5, the antiferromagnetic material layer 6 and the capping layer 9 (a layer product consisted of the under layer 2, the spin valve multi-layered structure and the capping layer 9).

Figure 1C:
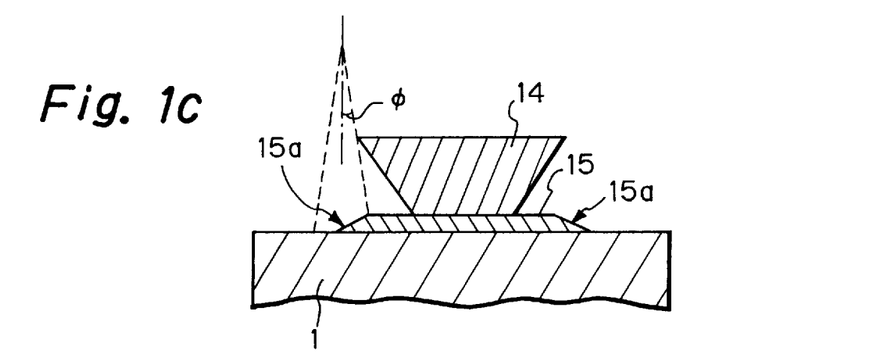

Thereafter, as shown in FIG. 1c, regions unmasked by the stencil mask 14 of the layered product 15 is etched and eliminated by a single-direction etching method such as an ion milling method. During the etching process, the substrate 1 and the layered product 15 are inclined by an appropriate angle $\phi$ for example $\phi=10°$ with respect to the incident ion beam and rotated around the central axis of the ion beam so as to eliminate the unmasked region of the layered product 15. Thus, a curved or straight tapered portions 15a are formed at the side faces of this patterned layered product 15.

Then, during the rotation of the substrate 1, thin film layers of hard ferromagnetic material 7 and 8 such as CoPt with a thickness of about 300 Angstroms and electrical leads of conductive material 10 and 11 such as Ta with a thickness of about 1000 Angstroms are sequentially deposited by sputtering. In this case, an under layer of TiW with a thickness of about 100 Angstroms is preferably formed prior to the Ta leads. The hard ferromagnetic material layers 7 and 8 are directly formed on the substrate 1 in contact with the tapered end regions of the spin valve multi-layered structure.

Figure 2:
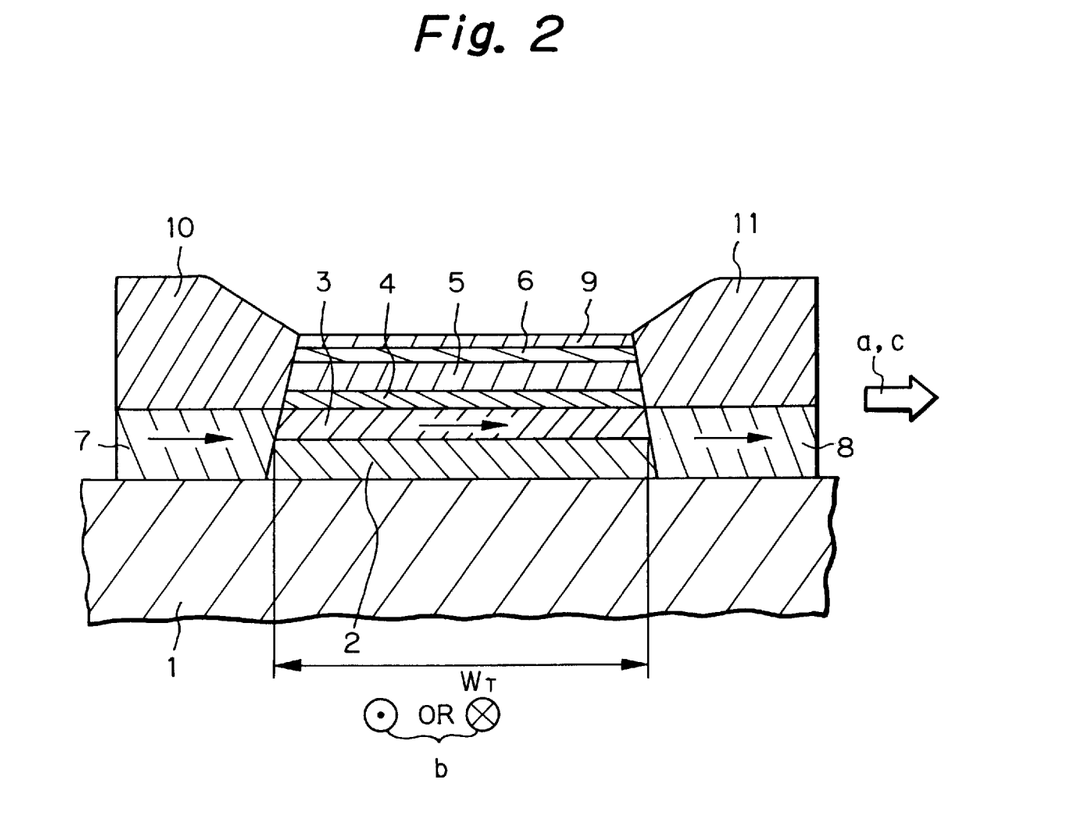
FIG. 2 is a sectional view schematically illustrating the MR head formed by the wafer process shown in FIG. 1.

The layers of hard ferromagnetic material 7 and 8 have high coercivety, high squareness and high resistivity and are adopted to produce a longitudinal bias for maintaining the first thin film layer of soft ferromagnetic material 3 in a single domain state as indicated by the arrows in FIG. 2.

Instead of the thin film layers of hard ferromagnetic material 7 and 8, thin film layers of antiferromagnetic material may be formed in the same manner. It is desired that under films of soft ferromagnetic material are formed under the antiferromagnetic layers, but in this case the under films of soft ferromagnetic material should be magnetically coupled with the first thin film layer of soft ferromagnetic material 3. The antiferromagnetic material for these thin film layers is selected to have a blocking temperature different from that of the antiferromagnetic material for the aforementioned thin film layer 6.

Figure 1D:
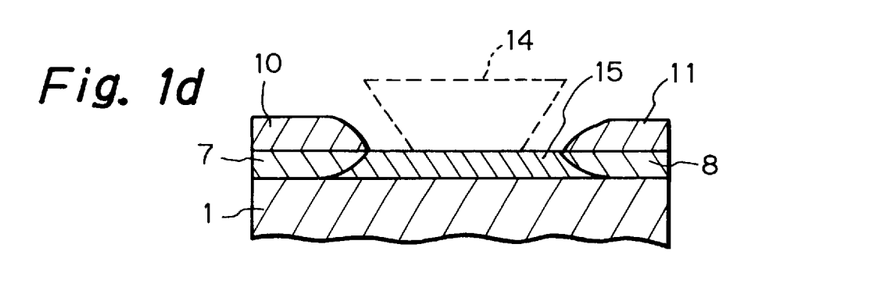

Then, as shown in FIG. 1d, the stencil mask 14 is removed by a lift-off process. CoPt, Ta and TiW which may be deposited on the stencil mask 14 are removed together with the stencil mask 14.

In this embodiment, abutting junctions for electrical and magnetic continuity of the spin valve multi-layered structure to the respective hard ferromagnetic material layers 7 and 8 are tapered so that these abutting junctions can be easily and quickly formed. However, the abutting Junctions are not limited to this tapered shape but can be formed in any optional shape.

The length of the abutting junctions along its tapered contour is preferably 3 to 5 times as long as the thickness of the spin valve multi-layered structure. This is because a length of about 0.1 to 0.3 $\mu$m is necessary for the abutting junctions and most of the spin valve multi-layered structures will have a thickness of 300 to 600 Angstroms. If the thickness of the spin valve multi-layered structure is less than 300 Angstroms, the electrical resistance of the MR element will become extremely high for applying appropriate sense current. Contrary to this, if the thickness of the spin valve multi-layered structure is more than 600 Angstroms, reading gap of the MR head will become too wide. If the length of the abutting junctions along its tapered contour is shorter than 0.1 $\mu$m, enough electrical and magnetic continuity cannot be expected. Also, if the length of the abutting junctions along its tapered contour is longer than 0.3 $\mu$m, undesirable off-track characteristics may be introduced because the track width of the MR head will be about 1 $\mu$m.

As a result of the above-mentioned wafer process, a large number of magnetic head transducer elements with spin valve multi-layered structures are formed on the wafer. In this wafer process, almost heat treatment stages at a process temperature which will vary a uniaxial anisotropy of the second soft ferromagnetic material layer 5 are executed in a vacuum environment with the application of a magnetic field. For example, the resist curing stage for curing the photoresist material of the stencil mask 14 is executed in a vacuum environment with the application of a magnetic field. In these heat treatment stages, a magnetic field is applied to the transducer elements in a vacuum environment so that a magnetic field component of several hundreds Oersteds (Oe) directed along the easy axis of the first soft ferromagnetic material layer 3 (the track width direction a shown in FIG. 2) is effectively applied to these elements. As a result of this application of the magnetic field, the magnetic characteristics of the first soft ferromagnetic material layer 3, a lower shield layer (not shown), an upper shield layer (not shown) and an upper pole layer (not shown) of the magnetic head can be stabilized.

Hereinafter, operations in a working process following to the above-mentioned wafer process will be described in detail.

Figure 3:
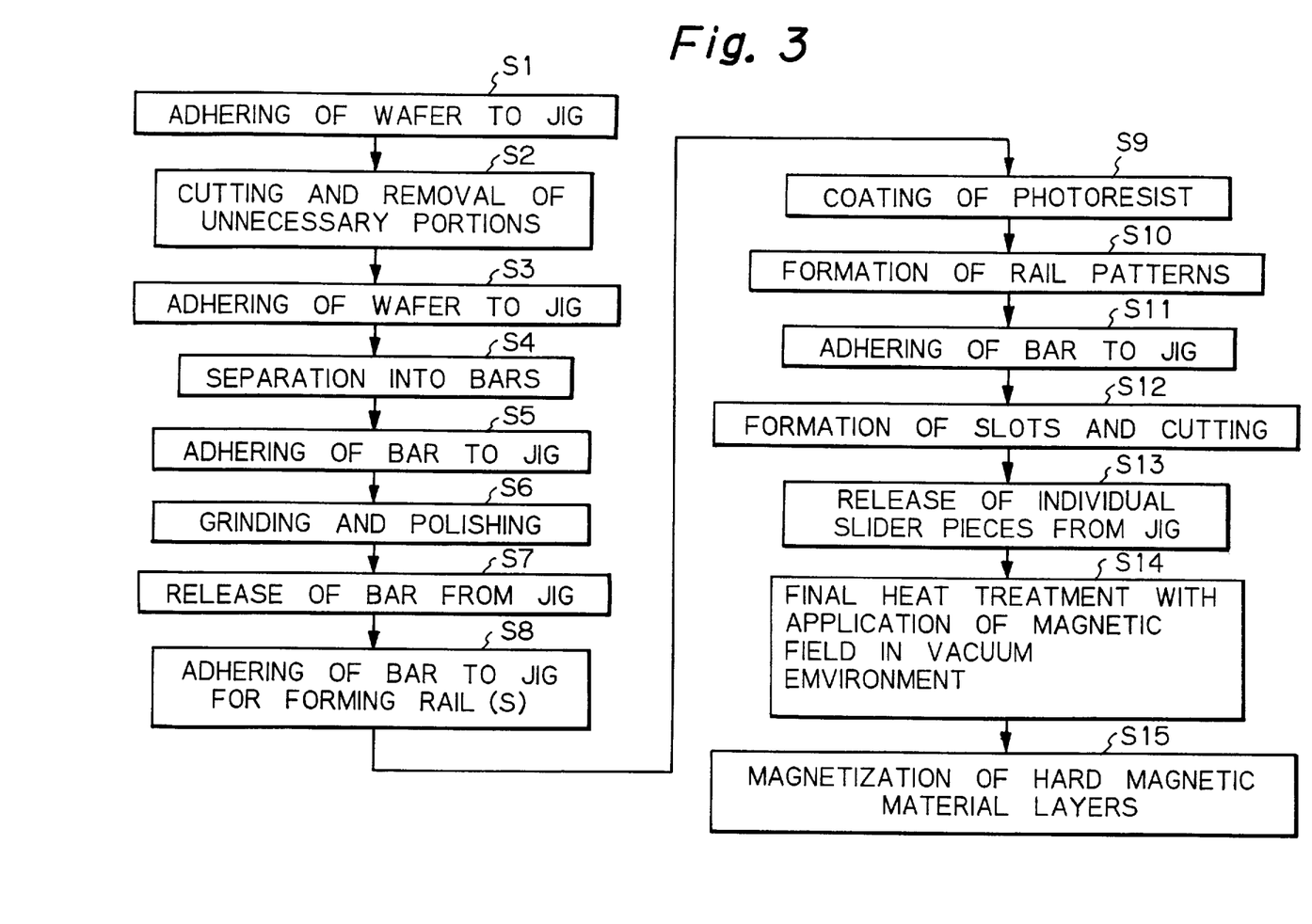
FIG. 3 is a process chart illustrating a part of a working process in a preferred embodiment of the MR head according to the present invention.

FIGS. 3 schematically illustrates a part of the working process in the preferred embodiment of the MR head according to the present invention.

First, at a step S1, the wafer on which a large number of the magnetic head transducer elements are formed is adhered to a jig. If a thermoplastic adhesive is used in this adhering step, a heat treatment at a temperature which will vary a uniaxial anisotropy of the second soft ferromagnetic material layer 5, for example a heat treatment at a temperature near the Neel temperature of the antiferromagnetic material of the layer 6 (100°–150° C.) will be executed. Then, at a step S2, unnecessary portions of the periphery of the wafer are cut and removed.

At a step S3, the wafer from which the unnecessary portions were cut and removed is adhered to an another jig for cutting and separating operations. In this adhering step, also, if a thermoplastic adhesive is used, a heat treatment at a temperature which will vary a uniaxial anisotropy of the second soft ferromagnetic material layer 5, for example a heat treatment at a temperature near the Neel temperature of the antiferromagnetic material of the layer 6 (100°–150° C.) will be executed. Then, at a step S4, the wafer is cut and separated into a plurality of bars so that each bar includes the magnetic head transducer elements aligned along a single line.

Then, at a step S5, each of the separated bars is adhered to an another jig. If a thermoplastic adhesive is used in this adhering step, a heat treatment at a temperature which will vary a uniaxial anisotropy of the second soft ferromagnetic material layer 5, for example a heat treatment at a temperature near the Neel temperature of the antiferromagnetic material of the layer 6 (100°–150° C.) will be executed. Then, at a step S6, the throat height of each of the magnetic head sliders is adjusted by grinding and polishing the bar adhered to the jig.

At a step S7, the bar is released from the jig. At this release step of the bar, if a thermoplastic adhesive was used for adhering, a heat treatment at a temperature which will vary a uniaxial anisotropy of the second soft ferromagnetic material layer 5, for example a heat treatment at a temperature near the Neel temperature of the antiferromagnetic material of the layer 6 (100°–150° C.) will be executed. Similar to this step S7, when the wafer is released from the jig after the step S2 and/or when the bar is released from the jig after the step S4, a heat treatment at a temperature which will vary a uniaxial anisotropy of the second soft ferromagnetic material layer 5, for example a heat treatment at a temperature near the Neel temperature of the antiferromagnetic material of the layer 6 (100°–150° C.) may be executed.

At a next step S8, the ground and polished bar is adhered to a jig for forming a rail or rails. Then, at a step S9, a photoresist film is coated over the bar. At these steps S8 and S9, a heat treatment at a temperature which will vary a uniaxial anisotropy of the second soft ferromagnetic material layer 5, for example a heat treatment at a temperature near the Neel temperature of the antiferromagnetic material of the layer 6 (100°–150° C.,) may be executed.

Then, at a step S10, a plurality of rail patterns for respective magnetic head sliders are formed on the bar by sequentially executing patterning of the photoresist, ion milling and removal of the photoresist.

At a next step S11, the bar with the formed rail or rails is adhered to a jig. If a thermoplastic adhesive is used in this adhering step, a heat treatment at a temperature which will vary a uniaxial anisotropy of the second soft ferromagnetic material layer 5, for example a heat treatment at a temperature near the Neel temperature of the antiferromagnetic material of the layer 6 (100°–150° C.) will be executed. At a step S12, a plurality of slots for respective magnetic head sliders are formed on the bar and then the bar is cut in order to separate it into individual head sliders.

Then, at a step S13, the individual head sliders are released from the jig. At this release step of the sliders, if a thermoplastic adhesive was used for adhesive, a heat treatment at a temperature which will vary a uniaxial anisotropy of the second soft ferromagnetic material layer 5, for example a heat treatment at a temperature near the Neel temperature of the antiferromagnetic material of the layer 6 (100°–150° C.) will be executed.

At a next step S14, a final heat treatment stage for providing the second soft ferromagnetic material layer 5 which is pinned by the antiferromagnetic material layer 6 a uniaxial anisotropy. In this final heat treatment stage, at first the separated individual slider pieces are attached to a jig, and then these head slider pieces are heated at a temperature with the application of a magnetic field for about one hour. This final heat treatment is preferably executed in a vacuum environment, but it is possible to execute the treatment in a non-vacuum environment. It is desired, in this embodiment, that the temperature for this final heat treatment is equal to or higher than a temperature at which a shifted amount of the BH loop of the second soft ferromagnetic material layer 5 in each slider piece along the applied magnetic field direction measured at room temperature after this heat treatment stage (Hua) is equal to a 20% value of the maximum value of the shifted amount Hua. More preferably, this temperature for the final heat treatment is selected to a value nearly equal to or higher than the Neel temperature of the antiferromagnetic material of the layer 6. Most preferably, this temperature for the final heat treatment is selected to a value equal to or higher than the Neel temperature of the antiferromagnetic material of the layer 6 (about 150°–200° C.). The magnetic field to be applied to the slider pieces in this final heat treatment should be directed toward substantially perpendicular to the easy axis of the first soft ferromagnetic layer 3 (toward the direction of b shown in FIG. 2, which is perpendicular to the track width direction) and has a value of about 5–10 kilo-Oersteds (kOe) so that a magnetic field component of several hundreds Oersteds (Oe) is effectively applied to the transducer elements in the slider pieces.

Then, at a step S15, the hard ferromagnetic material layers 7 and 8 are magnetized to a direction parallel to the plane of the magnetic layers as indicated by arrows in FIG. 2 by applying a magnetic field of about 3–10 kilo-Oersteds (kOe) toward the above-mentioned direction (the track width direction c shown in FIG. 2). Since the magnetization of the hard ferromagnetic material layers 7 and 8 is executed after the final heat treatment stage, the correct magnetization direction can be certainly obtained.

It is not important that the final heat treatment stage at the step S14 always follows the slider pieces release stage at the step S13, but it is important that this final heat treatment is executed after all the heat treatment stages wherein their process temperature will vary a uniaxial anisotropy of the second soft ferromagnetic material layer 5 are completed. For example, if this condition is satisfied, the final heat treatment may be executed after the bar adhering stage at the step S11, after the photoresist coating stage at the step S9, after the bar release stage at the step S7, after the bar adhering stage at the step S5, after the wafer adhering stage at the step S3, or after the wafer adhering stage at the step S1. However, this final heat treatment stage should be executed after removal of the photoresist or the thermoplastic adhesive if it is used in the preceding coating or adhering stage.

It should be noted that, according to this embodiment, the final heat treatment stage for providing a uniaxial anisotropy to the second soft ferromagnetic material layer 5 which is pinned by the antiferromagnetic material layer 6 is executed after all the heat treatment stages during not only the wafer process but also the working process after the wafer process, wherein their process temperature will vary a uniaxial anisotropy of the second soft ferromagnetic material layer 5, are completed. Thus, even if the antiferromagnetic layer 6 is made of an antiferromagnetic material with a relatively low Neel temperature such as FeMn or NiO, the anisotropy provided for the second soft ferromagnetic material layer 5 can be correctly and surely controlled.

In an assembling process to make the magnetic head apparatus, following to the working process of the MR head, if heat treatments at a temperature which will vary a uniaxial anisotropy of the second soft ferromagnetic material layer 5, for example heat treatment stages at a temperature near the Neel temperature of the antiferromagnetic material of the layer 6 (100°–150° C.) such as wire bonding stage and/or a plastic material mold stage are executed, the final heat treatment stage at the step S14 and the magnetization stage at the step S15 will be executed after all the above-mentioned heat treatments are finished.

Hereinafter, the temperature which will vary a uniaxial anisotropy of the second soft ferromagnetic material layer 5 and the temperature in the final heat treatment stage for providing a uniaxial anisotropy to the second soft ferromagnetic material layer 5 which is pinned by the antiferromagnetic material layer 6 will be illustrated with reference to FIGS. 4 to 7.

Figure 4:
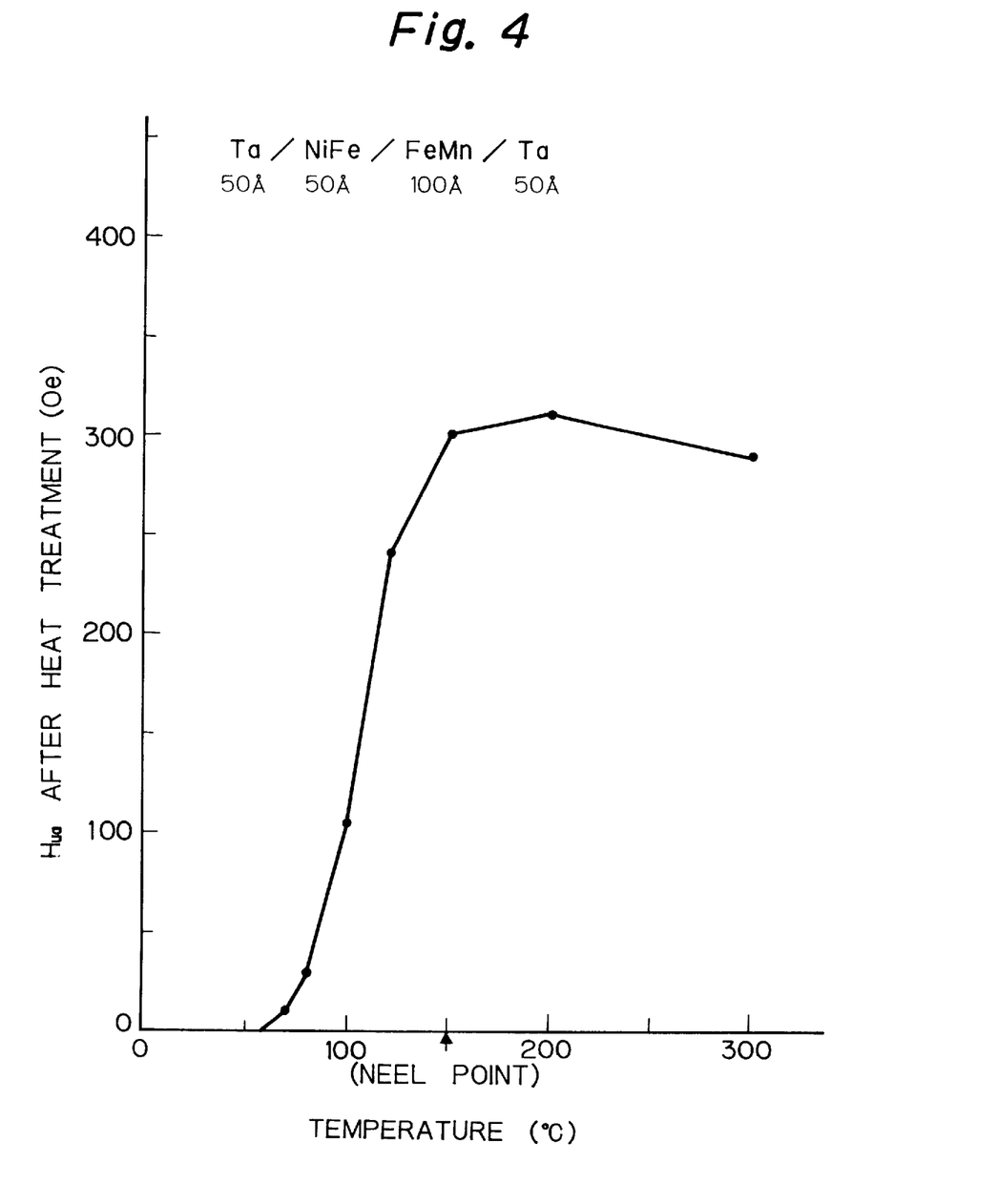
FIG. 4 is a graph showing Hua of B-H loop of the pinned thin film layer of soft ferromagnetic material at room temperature versus heat treatment temperature of a multi-layered structure utilizing the AMR effect.
Figure 5:
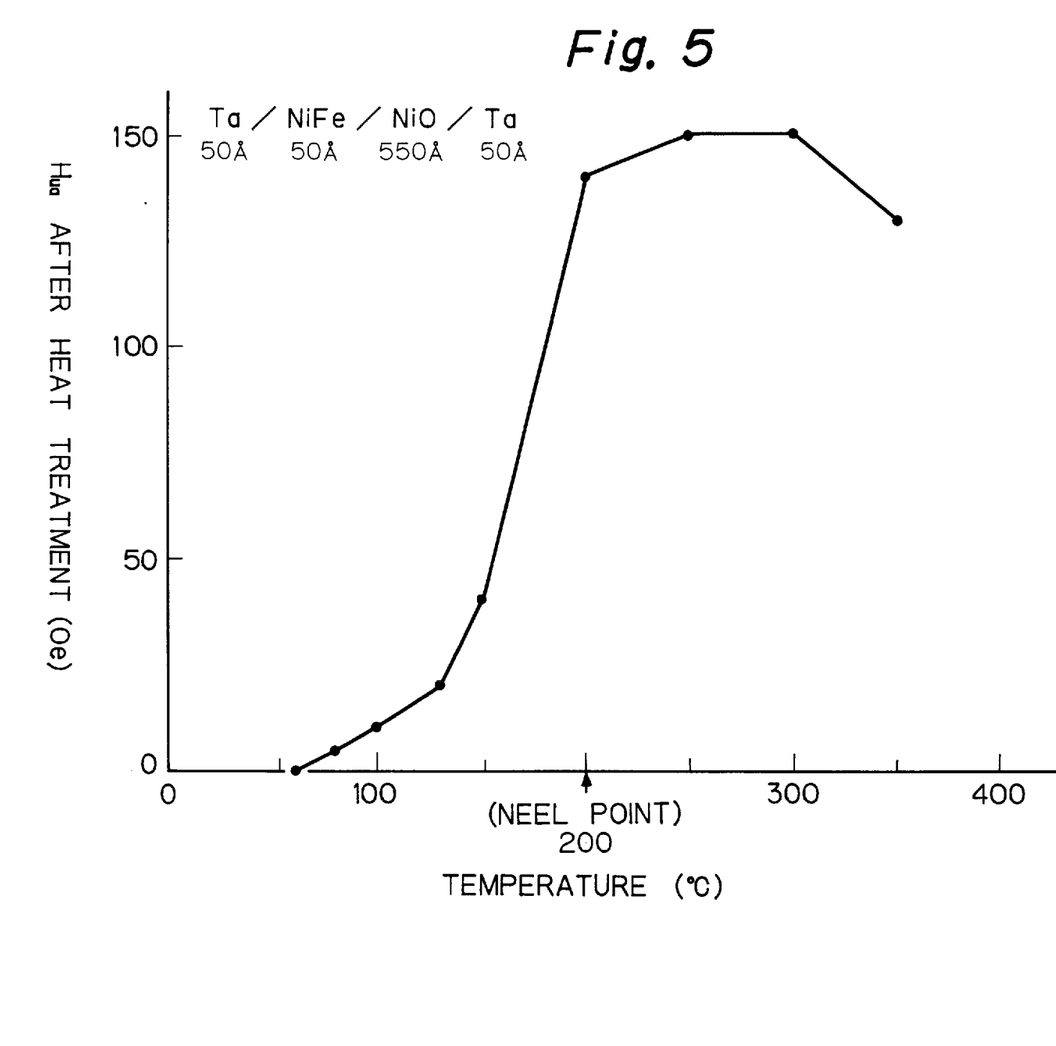
FIG. 5 is a graph showing Hua of B-H loop of the pinned thin film layer of soft ferromagnetic material at room temperature versus heat treatment temperature of a multi-layered structure utilizing the AMR effect.

FIGS. 4 and 5 show Hua of pinned soft ferromagnetic material layers in structures utilizing the anisotropic magnetoresistive (AMR) effect versus the process temperature of the heat treatment for one hour, during which treatment a magnetic field of about 1 kilo-Oersteds (kOe) is applied in a direction perpendicular to the direction of the magnetic field applied to the structures during depositions of their magnetic layers. The Hua is a shifted amount of the BH loop of the pinned soft ferromagnetic material layer in the AMR structure along the applied magnetic field direction, measured at room temperature after this heat treatment.

FIG. 4 indicates the temperature-Hua characteristics with NiFe as for the antiferromagnetic material, whereas FIG. 5 indicates the characteristics with NiO as for the antiferromagnetic material. Namely, the AMR structure with respect to FIG. 4 is formed by sequentially depositing Ta with a thickness of about 50 Angstroms, NiFe with a thickness of about 50 Angstroms, FeMn with a thickness of about 100 Angstroms and Ta with a thickness of about 50 Angstroms, whereas the AMR structure with respect to FIG. 5 is formed by sequentially depositing Ta with a thickness of about 50 Angstroms, NiFe with a thickness of about 50 Angstroms, NiO with a thickness of about 550 Angstroms and Ta with a thickness of about 50 Angstroms.

Figure 6:
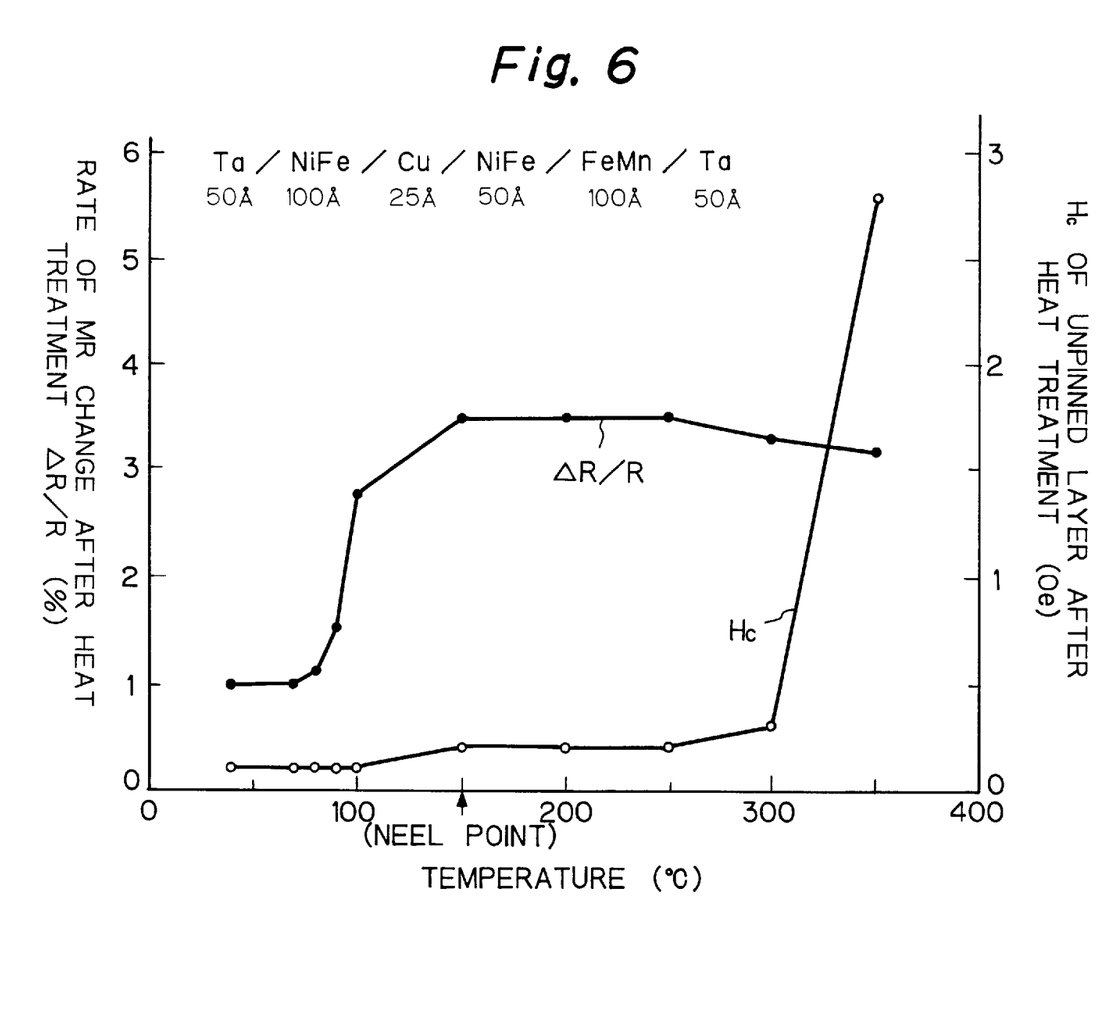
FIG. 6 is a graph showing magnetoresistive response at room temperature versus heat treatment temperature of a multi-layered structure utilizing the spin valve MR effect, and Hc of B-H loop of the unpinned thin film layer of soft magnetic material in the structure versus heat treatment temperature.
Figure 7:
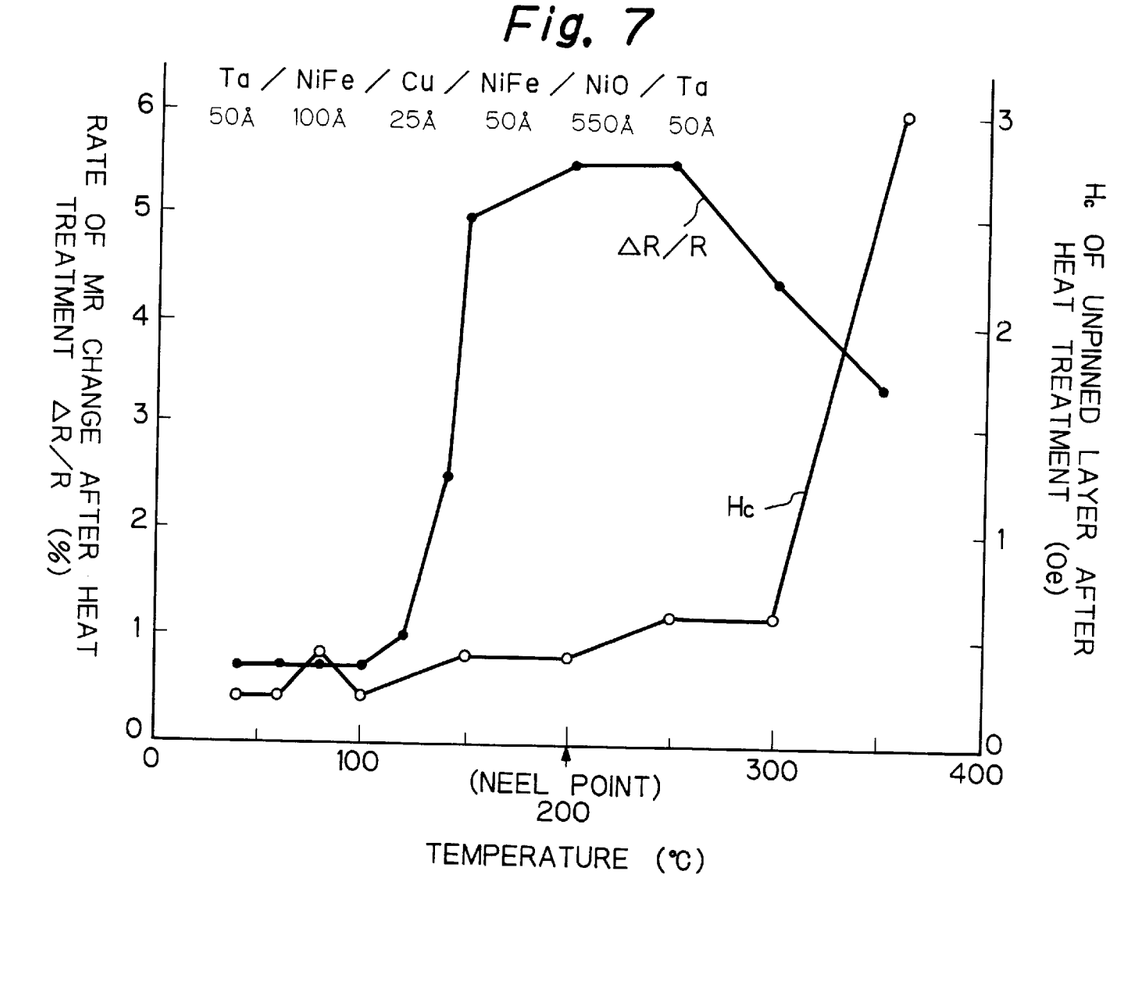
FIG. 7 is a graph showing magnetoresistive response at room temperature versus heat treatment temperature of a multi-layered structure utilizing the spin valve MR effect, and Hc of B-H loop of the unpinned thin film layer of soft magnetic material in the structure versus heat treatment temperature.

FIGS. 6 and 7 show a rate of MR change (ΔR/R) of structures utilizing the spin valve MR effect versus the process temperature of the heat treatment and Hc of the BH loop of unpinned soft ferromagnetic material layers in the structures versus the process temperature. The heat treatment is executed for one hour with the application of a magnetic field of about 1 kilo-Oersteds (kOe) in a direction perpendicular to the direction of a magnetic field applied to the structures during depositions of their magnetic layers (in a direction perpendicular to the magnetization easy axis of the unpinned soft ferromagnetic material layer). The rate of MR change is measured at room temperature with the application of a magnetic field of about 100 Oersteds (Oe) in the same direction as that executed in the heat treatment, and Hc is the coercive force of the BH loop of the unpinned soft ferromagnetic material layer along the magnetization easy axis thereof, measured at room temperature after the heat treatment.

FIG. 6 indicates the temperature-ΔR/R and temperature-Hc characteristics with NiFe as for the antiferromagnetic material, whereas FIG. 7 indicates the characteristics with NiO as for the antiferromagnetic material. Namely, the spin valve MR structure with respect to FIG. 6 is formed by sequentially depositing Ta with a thickness of about 50 Angstroms, NiFe with a thickness of about 100 Angstroms, Cu with a thickness of about 25 Angstroms, NiFe with a thickness of about 50 Angstroms, FeMn with a thickness of about 100 Angstroms and Ta with a thickness of about 50 Angstroms, whereas the spin valve MR structure with respect to FIG. 7 is formed by sequentially depositing Ta with a thickness of about 50 Angstroms, NiFe with a thickness of about 100 Angstroms, Cu with a thickness of about 25 Angstroms, NiFe with a thickness of about 50 Angstroms, NiO with a thickness of about 550 Angstroms and Ta with a thickness of about 50 Angstroms.

As will be understood from FIGS. 4 and 5, when the heat treatment temperature is equal to or higher than a value of the Neel point (Neel temperature) of the antiferromagnetic material minus 90°–140° C., the Hua of the soft ferromagnetic material layer pinned by the antiferromagnetic material layer changes from zero. If this Hua is increased to a certain value or more, the uniaxial anisotropy of the pinned soft ferromagnetic material layer will vary. Thus, the final heat treatment should be executed after all the heat treatments at a temperature equal to or higher than the temperature which will vary a uniaxial anisotropy of the pinned soft ferromagnetic material layer finished.

It is desired that the temperature in the final heat treatment is equal to or higher than a temperature at which the shifted amount of the BH loop of the pinned soft ferromagnetic material layer (Hua) is equal to 20% of the maximum value of the Hua. The temperature corresponding to the Hua value of 20% of the maximum Hua is about 90° C. in the example of FIG. 4 and about 140° C. in the example of FIG. 5. If the final heat treatment is executed at a low temperature, the anisotropy of the soft ferromagnetic material layer to be pinned may not be controlled to the correct direction. This can be detected because the measured ρ-H loop of the pinned soft ferromagnetic material layer which is finally heat treated by the low temperature will become a substantially horizontal flat line as well as that when no final heat treatment is executed. According to experiments of the inventors of this application, it is confirmed that a rate for manufacturing defective heads (percent defective) wherein a uniaxial anisotropy of the soft ferromagnetic material layer to be pinned may not be controlled to a correct direction becomes 50% or more when the final heat treatment is executed at a temperature lower than the temperature corresponding to the Hua value of 20% of the maximum Hua. Therefore, it is desired that the process temperature for the final heat treatment is equal to or higher than a temperature at which a shifted amount of the BH loop of the pinned soft ferromagnetic material layer along the applied magnetic field direction measured at room temperature after the heat treatment stage is equal to a 20% value of the maximum value of the shifted amount. In order to obtain better characteristics, in fact, this temperature for the final heat treatment is more preferably selected to a value substantially equal to or higher than the Neel temperature of the antiferromagnetic material, and most preferably, this temperature for the final heat treatment is selected to a value equal to or higher than the Neel temperature of the antiferromagnetic material.

Furthermore, as shown in FIGS. 6 and 7, when the heat treatment temperature is higher than 300° C., the coercive force Hc of the BH loop of the unpinned soft ferromagnetic material layer (NiFe) abruptly increases causing the sensitivity of the spin valve MR head to lower and causing reproduced wave there from to distort due to hysteresis produced in the MR curve. Thus, it is desired that all the heat treatment, not only the final heat treatment but also any heat treatment processed before the final heat treatment, should be executed at a temperature equal to or lower than 300° C. As a result, deterioration of each thin film layer in the head can be reduced.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method of manufacturing a magnetic head apparatus with a magnetoresistive head utilizing a spin valve effect, said method comprising the steps of:

a first step of forming a multi-layered spin valve structure on a substrate, said structure including at least first and second thin film layers of soft ferromagnetic material separated by a thin film layer of non-magnetic material, one of said first and second thin film layers of ferromagnetic material being pinned by a thin film layer of antiferromagnetic material;

a second step of forming a spin valve magnetoresistive head using the multi-layered spin valve structure; and a third step of assembling a magnetic head apparatus using said spin valve magnetoresistive head, at least one of said first to third steps including a heat treatment stage executed at a temperature which will vary a uniaxial anisotropy of said pinned thin film layer of soft ferromagnetic material, said method further including a final heat treatment step of heating said multi-layered spin valve structure with application of a magnetic field in a direction perpendicular to a track width direction of said spin valve magnetoresistive head so that said pinned thin film layer of soft ferromagnetic material has a uniaxial anisotropy, said final heat treatment step being executed after said heat treatment stage is completed and at least after one of said second to third steps.

2. The method as claimed in claim 1, wherein said final heat treatment step is a step of heating said multi-layered spin valve structure at a temperature equal to or higher than a temperature at which a shifting amount of the BH loop of said pinned thin film layer of soft ferromagnetic material due to the heat treatment becomes equal to a 20% value of the maximum shifting amount of the BH loop.

3. The method as claimed in claim 1, wherein said final heat treatment step is a step of heating said multi-layered spin valve structure at a temperature equal to or higher than the Neel temperature of the antiferromagnetic material of said antiferromagnetic thin film layer.

4. The method as claimed in claim 1, wherein said heat treatment stage executed before said final heat treatment step is a heating step at a temperature equal to or lower than 300° C.

5. The method as claimed in claim 1, wherein said final heat treatment step is a heating step at a temperature equal to or lower than 300° C.

6. The method as claimed in claim 1, wherein said heat treatment stage executed before said final heat treatment step includes a heat treatment stage applying a magnetic field in a direction along the track width direction to said multi-layered spin valve structure.

7. The method as claimed in claim 1, wherein the other one of said first and second thin film layers of ferromagnetic material being unpinned by a thin film layer of antiferromagnetic material, and wherein said method further includes a step of forming thin film layers of hard ferromagnetic material in contact with both ends in the track width direction of said unpinned thin film layer of soft ferromagnetic material, respectively.

8. The method as claimed in claim 7, wherein said method further includes a step of applying a magnetic field in the track width direction to said thin film layers of hard ferromagnetic material so as to magnetize said thin film layers of hard ferromagnetic material, said applying step being executed after said final heat treatment step is completed.

9. The method as claimed in claim 7, wherein said method further includes a step of forming thin film layers of conductive material on said thin film layers of hard ferromagnetic material, respectively.

* * * * *